(12) United States Patent
Jensen et al.

(10) Patent No.: US 8,910,758 B2
(45) Date of Patent: Dec. 16, 2014

(54) INTEGRATED RETARDER AND FRICTION BRAKE (75) Inventors: Joshua Jensen, Peoria, IL (US); Stephen Dockstader, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 149 days.

(21) Appl. No.: 13/424,086

(22) Filed: Mar. 19, 2012

(65) Prior Publication Data
US 2013/0240312 A1  Sep. 19, 2013

(51) Int. Cl.
*F16D 57/02* (2006.01)

(52) U.S. Cl.
USPC .......................... 188/296; 188/271

(58) Field of Classification Search
CPC .......... F16D 63/00; F16D 57/04; F16D 65/78
USPC .......................... 188/271, 296, 291
See application file for complete search history.

(56) References Cited

U.S. PATENT DOCUMENTS

| | | | |
|---|---|---|---|
| 2,517,531 A * | 8/1950 | Anderson | 188/271 |
| 3,334,711 A * | 8/1967 | Anderson | 188/271 |
| 3,882,975 A * | 5/1975 | Jedlitschka et al. | 188/271 |
| 4,066,157 A | 1/1978 | Gibbs | |
| 4,235,320 A | 11/1980 | Polak et al. | |
| 4,324,320 A | 4/1982 | Spurlin et al. | |
| 4,846,316 A | 7/1989 | Fujinami | |
| 5,441,335 A | 8/1995 | Stumpe et al. | |
| 6,382,379 B2 | 5/2002 | Yoshimoto et al. | |

FOREIGN PATENT DOCUMENTS

| | | |
|---|---|---|
| DE | 2028294 A1 | 12/1971 |
| DE | 3440081 A1 | 7/1986 |
| EP | 0793033 A1 | 9/1997 |

* cited by examiner

*Primary Examiner* — Xuan Lan Nguyen
(74) *Attorney, Agent, or Firm* — Finnegan, Henderson, Farabow, Garrett & Dunner LLP (57) ABSTRACT

A brake assembly integrates both an impeller brake and a friction brake into an integrated brake assembly that provides for retarding and/or friction braking in response to a single braking action on a single brake assembly by the operator. In neutral, the impeller brake and the friction brake are disengaged from a brake hub. In a first braking position under a first applied fluid pressure, the brake hub engages the impeller brake for retarding axle rotation. In a second braking position under a second applied fluid pressure, the brake hub frictionally engages the friction brake for frictionally braking axle rotation.

12 Claims, 6 Drawing Sheets

INTEGRATED RETARDER AND FRICTION BRAKE

TECHNICAL FIELD

The present disclosure relates generally to brake assemblies, and more particularly, to brake assemblies for providing retarder and friction brake controls in response to brake demand.

BACKGROUND

A hydraulic retarder brake and a friction brake are important devices for braking large scale and other machines. The hydraulic retarder brake is used when heavy braking is required such as on descending a slope. Using a service brake alone may cause excessive heat generation in the friction portion of the service brake. Using the hydraulic retarder brake may decrease heat generation and thus prevent excessive wear or damage. The hydraulic retarder typically has a set of rotor blades, a set of stator blades, and a hydraulic fluid coupling. The rotor blades rotate with a wheel, the stator blades are fixed to a housing mounted on the machine, and the hydraulic fluid coupling between the opposing rotor blades and stator blades transmits the energy of rotating rotor blades to the circulating hydraulic fluid as heat due to the viscosity of the hydraulic fluid resulting in deceleration of the machine. Hydraulic retarder brakes may also be used with a transmission or a power train.

The friction brake is typically a disc brake that is engaged against all or certain wheels of the machine, such as the rear wheels, typically through a manual or automatic clutch when emergency stopping is required. Emergency friction braking for off highway machines may be designed to meet requirements for stopping based on grade, weight, location, and population.

Conventional braking system designs generally treat retarding and friction braking actions as separate and independent events that require two brake assemblies—a first brake assembly for providing the retarding action and a second brake assembly for providing the friction brake action. See, for example U.S. Pat. No. 4,235,320, which describes a retarder brake assembly and a friction brake assembly that are controlled according to schedules. These conventional braking systems are expensive because they require two separate brake assemblies. They take up more space because each brake assembly has an independent blueprint. Because they are separate braking systems they require a separate set of input controls by the operator. In addition, the efficiency of a brake system which combines a retarder brake assembly and a separate friction brake assembly is generally the sum of the efficiencies of each separate brake assembly part. There are little braking efficiencies that each separate brake assembly draws from the other brake assembly in performing braking action.

There is a need for a braking system that is less expensive, takes up less space, and is more efficient in delivering both retarder and friction braking action. This disclosure addresses this or other problems in the prior art.

SUMMARY OF THE INVENTION

An illustrative retarding brake assembly includes a brake hub for mounting inside a housing of an axle of a machine for movement in an axial direction. The retarding brake assembly further includes an impeller brake for mounting inside said housing and a friction brake for mounting inside the housing. In a neutral position, the impeller brake and the friction brake are disengaged from the brake hub. In a first braking position under the action of a first applied hydraulic fluid pressure, the brake hub engages the impeller brake for retarding rotation of the axle. In a second braking position under the action of a second applied hydraulic pressure, the brake hub frictionally engages the friction brake for frictionally braking rotation of the axle.

An illustrative method for braking rotation of an axle of a machine includes: applying a first hydraulic pressure command to a brake hub mounted inside a housing of an axle of a machine for movement in an axial direction to engage an impeller brake mounted inside said housing for retarding rotation of said axle; applying a second hydraulic pressure command to said brake hub to both engage said impeller brake for retarding rotation of said axle and frictionally engage a friction brake mounted inside said housing for frictionally braking rotation of said axle at a first braking level; and applying a third hydraulic pressure command to said brake hub to both engage said impeller brake for retarding rotation of said axle and frictionally engage said friction brake for frictionally braking rotation of said axle at a second braking level.

An illustrative machine with a retarding brake assembly includes a machine having a brake hub mounted inside a housing of an axle of said machine for movement in an axial direction. An impeller brake is mounted inside said housing and a friction brake is mounted inside the housing. In a neutral position, the impeller brake and the friction brake are disengaged from the brake hub. In a first braking position under the action of a first applied hydraulic fluid pressure, the brake hub engages the impeller brake for retarding rotation of said axle of the machine. In a second braking position under the action of a second applied hydraulic pressure, the brake hub frictionally engages the friction brake for frictionally braking rotation of said axle of said machine.

DETAILED DESCRIPTION

The disclosed assembly brake brings together the performance of an impeller brake and the performance of a friction brake into an integrated brake assembly design. By locating both an impeller and a friction brake into an integrated brake assembly, a higher performance brake assembly results; one that advantageously provides impeller braking action under machine operating conditions requiring less demanding brake action such as to retard or slow down the machine, and that advantageously provides friction brake action when more demanding brake action is required such as for dead stop braking all under a single braking action applied by the operator to one brake assembly. By setting a gap 150 inside the integrated brake assembly (shown in FIG. 3 and described below), the closing of which activates impeller braking, to be narrower than the gap 151 inside the integrated brake assembly (also shown in FIG. 3 and described below), the closing of which activates friction braking, the integrated brake assembly of this disclosure ensures that one brake assembly delivers both impeller braking action in circumstances where retarding or slowing down the machine is required and friction braking action when dead stop breaking is required; all in response to a single braking action controlled by the operator. A less expensive, more compact, and more efficient brake assembly is the result.

Figure 2:
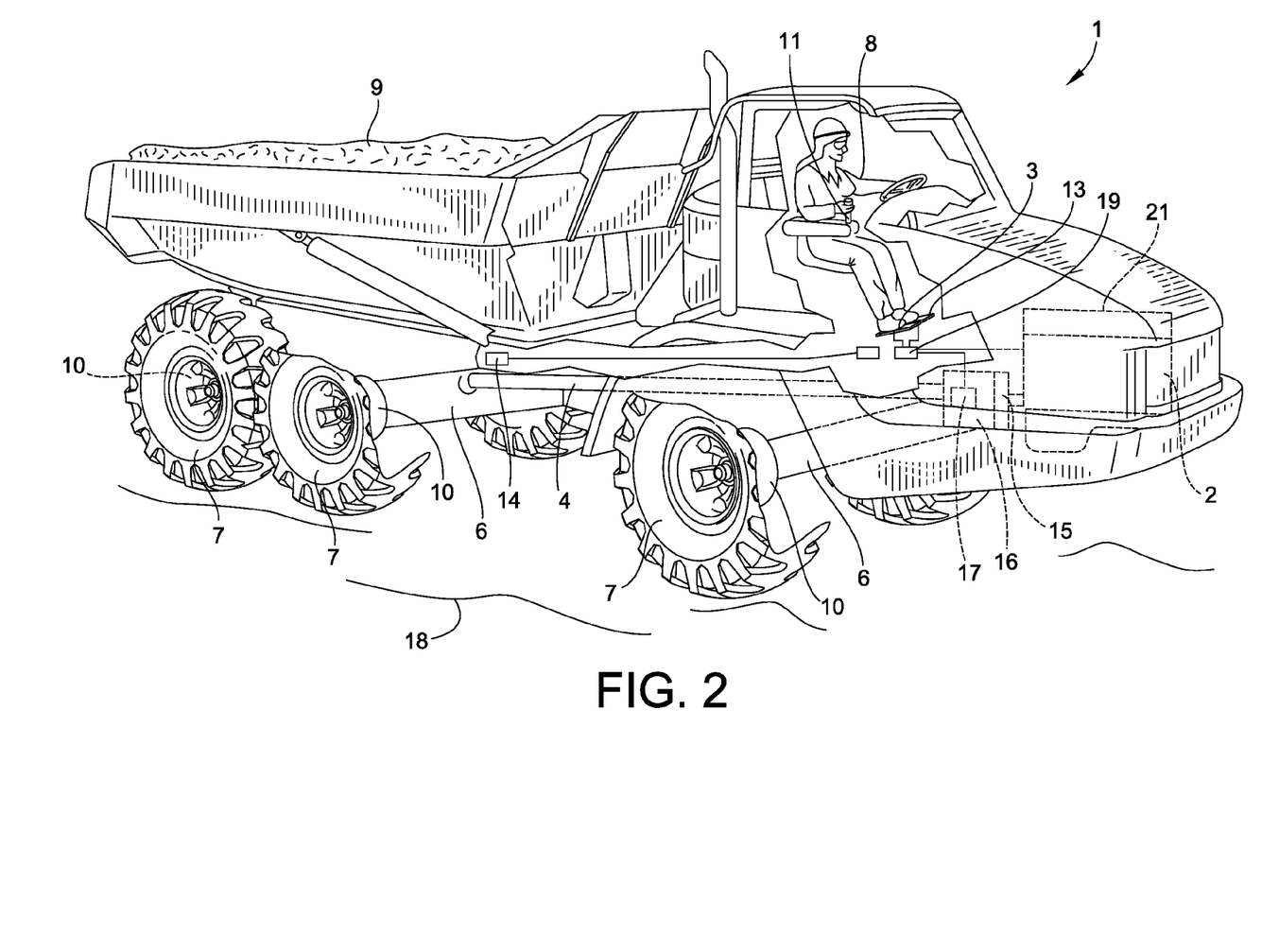
FIG. 2 is a pictorial illustration of an exemplary disclosed machine system for use of an illustrative brake assembly of the present disclosure.

FIG. 2 shows a machine 1 traveling on a terrain 18 which may be level or an inclined uphill or downhill surface but is shown level in the FIG. 2. Machine 1 may embody an articulated truck (as shown) or any other of a wide range of machines or moving machines. The machine 1 may include, for example: trucks, cars, on-highway trucks, dump trucks, off-highway trucks, earth moving machines, wheel loaders, compactors, excavators, track type tractors, dozers, motorgraders, wheel tractor-scrapers, or any other moving machine. Machine 1 may or may not be carrying a load 9.

The machine 1 shown in FIG. 2 includes an engine 2, powertrain retarder 15/21, transmission 16, automatic transmission control 17, driveshafts 4, 6 (element 6 interchangeably also referred to as "axle shaft" in this disclosure), wheels 7, machine or wheel brakes 10, controller 19, a grade sensor, load sensor 14, throttle 13, brake pedal 3, and retarder lever 11. The engine 2 delivers power to the wheels 7 through the transmission 16 and drive shafts 6. The throttle 13, brake pedal 3, and retarder lever 11 are controlled by an operator 8. The operator 8 may embody a driver (as shown) or an autonomous control system.

The powertrain retarder 15/21 includes devices or systems used to dissipate energy in systems powering or transmitting power to propel the machine 1. The powertrain retarder 15/21 may include a power retarder for an engine brake 21 and/or a power retarder for a transmission 15. The powertrain retarder 15/21 may include either of the engine brake retarder 21 or transmission retarder 15, or both. The engine brake retarder 21, transmission retarder 15, and any other included powertrain retarder may be used together and may complement one another.

The engine brake 21 is a device that retards or slows the engine 2 and machine 1 by dissipating energy. The engine brake 21, also known as a compression brake or Jake brake, works by actuating, opening, or controlling the engine's 2 valves. The engine brake 21 may open or actuate an exhaust valve of the engine 2 near top dead center of the compression stroke, thereby releasing compressed air into the exhaust to dissipate energy and slow the machine 1.

The transmission retarder 15, or another driveline retarder, dissipates energy in the driveline. The transmission retarder 15 may operate one or more hydraulic pumps attached to the transmission 16 to dissipate energy. The transmission retarder 15 may transfer fluid (hydraulic, transmission, or another available fluid) into a chamber spinning with the transmission 16. The chamber may include blades or other structures. When the fluid is added to the chamber, viscous drag is applied to the transmission 16 which dissipates energy and slows the machine 1. The transmission retarder 15 may also operate an electric motor, heater, or generator connected to the transmission 16 or driveshafts 4, 6 to dissipate energy.

The powertrain retarder 15, 21 may also include other retarders known in the art. For example, the powertrain retarder 15, 21 may include an exhaust brake that adds a controllable restriction in the exhaust system or an electric retarder that may use electromagnetic induction to apply a retarding force to the flywheel, transmission 16, or driveshafts 4, 6. Energy from the powertrain retarder 15, 21 may be used by other systems or stored for powertrain use later.

The controller 19 communicates with and controls the engine 2, powertrain retarder 15, 21, and transmission 16. The controller 19 also receives data from the grade sensor, throttle 13, brake pedal 3, and retarder lever 11. The controller 19 embodies an electronic control module or another processor known in the art capable of communicating, receiving, processing, and storing data. The controller 19 may also communicate, receive, and process more data with more systems than are described here. The grade sensor provides an indication of the grade of the terrain 18, upon which the machine 1 operates. The load sensor 14 provides an indication of the weight of the load 9 and machine 1.

The throttle 13 is depressed by the operator 8 to increase fuel to the engine 2 and increase the power of the machine 1. The brake pedal 3 is used by the operator 8 to apply the wheel brakes 10 and slow the machine 1. The retarder lever 11 is used by the operator 8 to apply the powertrain retarder 15, 21 and slow the machine 1. The controller 19 is configured to operate a system (not shown) for providing the above described control to the machine 1.

Figure 1:
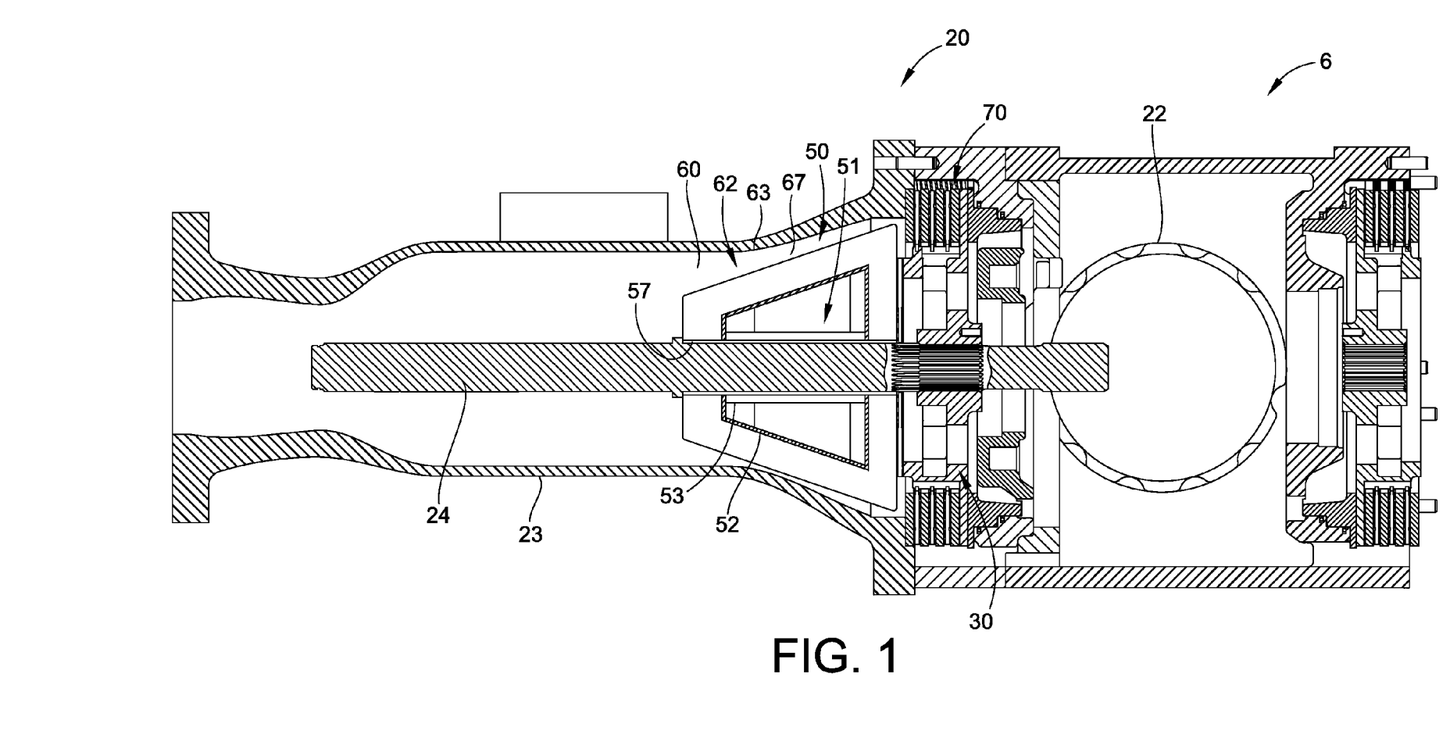
FIG. 1 is a cross sectional side view of an illustrative brake system according to the present disclosure.

In one exemplary aspect illustrated in FIG. 1, for use, illustratively, with a Caterpillar 725 Articulated Truck, this disclosure is directed to brake assembly 20, and illustratively a two-stage retarding integrated brake assembly 20 shown in FIG. 1 with a differential 22 which translates the torque from, as shown in FIG. 2, the drive shaft 4 to the axle shaft 6 of the machine 1 using a planetary set of gears (not shown) that, among other things, causes one wheel 7 on the axle shaft 6 to spin at one speed and another wheel 7 on the axle shaft 6 to spin at another speed. Differentials are well known in the art as are their operation. Illustratively, the integrated brake assembly 20 acts on certain wheels of the machine (shown in FIG. 2), such as the rear wheels. Alternatively, the brake assembly may act on all wheels of the machine.

Still referring to FIG. 1, brake assembly 20 has a brake hub 30 mounted along an axle 24 extending along axle shaft 6 (shown in FIG. 2) of the machine 1 for movement in an axial direction. A friction brake 70 is mounted inside a housing 23 of the axle shaft 6 and an impeller brake 50 is mounted inside the housing 23 along the axle 24 of the axle shaft 6 as described below. As taught by this disclosure, the brake assembly 20 advantageously brings together both the friction brake and the impeller brake into an integrated brake assembly design that provides for retarding and/or friction braking all in response to a single braking action on a single brake assembly—namely, the integrated brake assembly 20 of this disclosure—by the operator as described below.

The impeller brake 50 has an impeller rotor 51 mounted on axle 24 of the machine 1. Impeller rotor 51 defines a plurality of rotor blades 52 that extend outwardly from an outside surface 53 of the impeller rotor 51 into a cavity 60 of the housing 23. A stationary stator 62 is illustratively defined by an inside surface 63 of the housing 23. Alternatively, stator 62 may be a shroud (not shown) attached to the housing 23 along the inside surface 63 of the housing 23. As yet another illustrative example, stator 62 may be provided with blades (not shown) that extend inwardly from inside surface 63 of the housing 23 into cavity 60 of the housing 23. Impeller rotor 51 and stator 62 form a chamber 67 for holding an axle fluid (not shown). The axle fluid illustratively fills housing 23 to about the center line of axle 24 to provide what is known in the art as a center fill oil axle. The axle fluid provides fluid coupling between the rotor blades 52 and the stator 62 of the impeller brake 50.

A bearing 57 disposed between the impeller rotor 51 and the axle 24 disengages impeller rotor 51 from axle 24 when the brake assembly is being operated in a neutral position of no braking for reducing drag from the impeller rotor on the axle when the brake assembly is being operated in the neutral position of no braking. Illustratively, the bearing 57 is a sleeve of material (not shown) having a low coefficient of friction such as steel, brass, or bronze. Alternatively, bearing 57 may be a roller element bearing that provides a low coefficient of friction to the impeller rotor 51 and the axle 24 when the brake is being operated in the neutral position of no braking.

Figure 3:
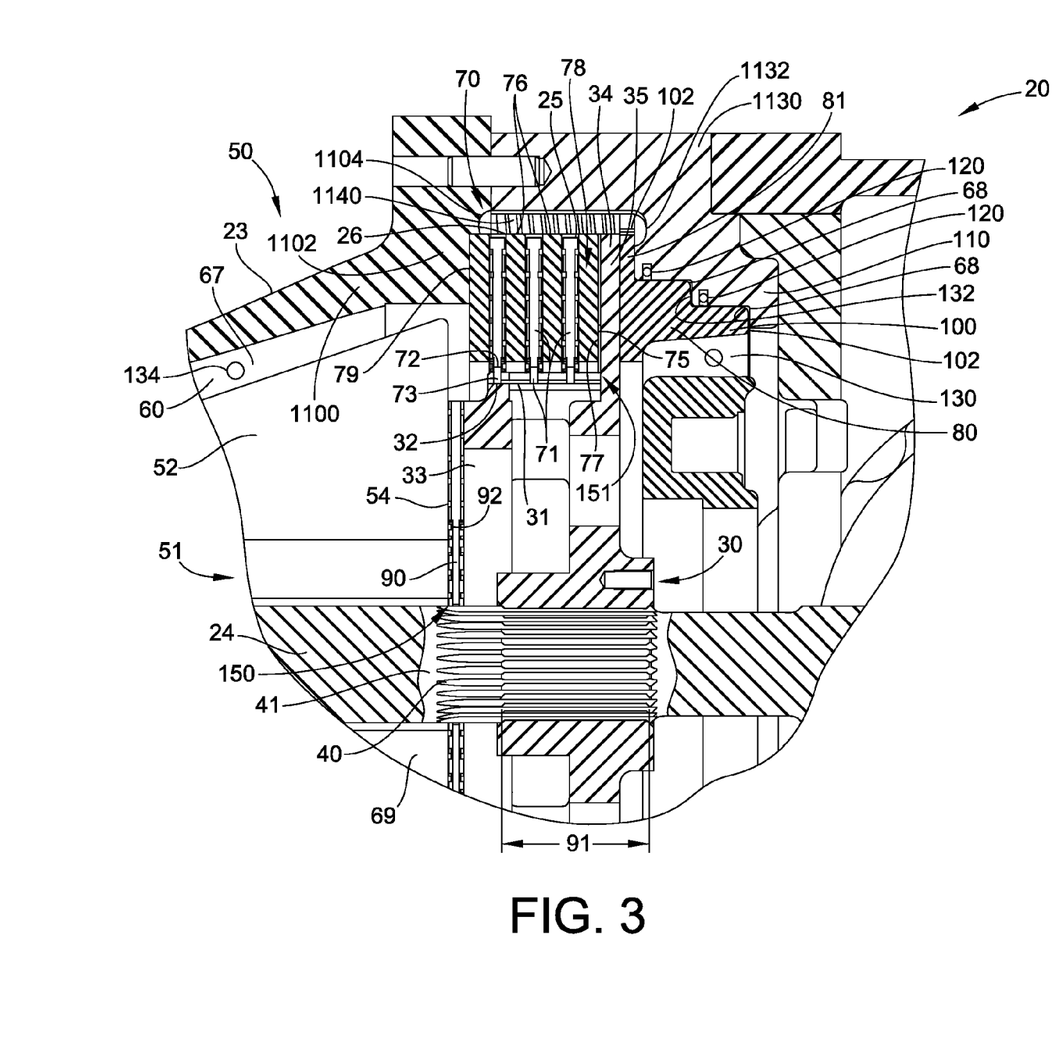
FIG. 3 is an enlargement of FIG. 1 showing in greater detail the illustrative brake system in FIG. 1 according to the present disclosure.

As illustrated in FIG. 3, friction brake 70 comprises a plurality of rotatable friction discs 71 mounted for rotation with the axle 24. A plurality of separator plates 76, one between each pair of adjacent rotatable friction discs 71, are attached to said housing 23 for axial movement. Rotatable friction discs 71 have an annular shape (not shown) having an inside surface 72 provided with splines 73 for engagement with grooves 31 that extend axially along an outer surface 32 of the brake hub 30. Separator plates 76 may have an annular shape (not shown) having an outside surface 77 provided with splines (not shown) for engagement with grooves 25 that extend axially along an inside surface 26 of the housing 23. Alternatively, the rotatable friction discs 71 may be connected to brake hub 30 or the separator plates 76 may be connected to the housing 23 by interlocking fit or by other form of connection. The grooves 25 allow the splines connected therewith, and hence the friction discs and separator plates that form the friction brake 70, to move axially under the influence of a hydraulic fluid pressure as described below. Grooves 31 along the brake hub 30 and grooves 25 along the housing 23 permit movement of the friction brake 70 along a length that is illustratively longer than the width of a second gap 151 discussed below that is defined by the brake assembly 20 as discussed in detail below with the exact length of the grooves depending upon the machine 1 in which brake assembly 20 is used.

Brake hub 30 has a first portion 33 facing impeller brake rotor 51, a second portion 34 facing a first portion 78 of friction brake 70, and a third portion 35 facing a first portion 81 of a brake piston 100. Disposed between said first portion 33 of said brake hub 30 and the impeller rotor 51 of the brake impeller 50 is a friction disc 90 mounted on axle 24 of the machine 1 for rotation therewith. Friction disc 90 has an annular shape (not shown) having an inside surface (not shown) provided with splines (not shown) for engagement with grooves 40 that extend axially along an outer surface 41 of the axle 24. The grooves 40 allow the splines 93 connected therewith and hence the friction disc 90 to move axially along the axle 24 under the influence of a hydraulic fluid pressure as described below. Brake hub 30 is connected to the axle 24 in a fashion similar to the connection of the rotatable friction disc 71 to the axle 24, namely, with an inside surface (not shown) of the brake hub 30 provided with splines (not shown) for engagement with the grooves 40 that extend axially along an outer surface 41 of the axle 24 to enable movement of the brake hub along the axle 24 under the influence of the hydraulic fluid pressure. As an example of an alternative connection, the inside surface of the hub may be notched, a groove (not shown) may be notched into the axle, and a key (not shown) may be inserted between the notch on the inside surface of the hub and the groove on the axle to keep the brake hub rotating with the axle while allowing for axial displacement of the brake hub by movement of the notch of the hub along the groove in the axle under the influence of fluid pressure.

The brake piston 100 is disposed between a back plate 110 of said housing 23 and the third portion 35 of the brake hub 30. The brake piston 100 is attached to the housing 23 using dowels and tabs (not shown). Hydraulic fluid enters brake assembly 20 through oil ports 120. Hydraulic oil entering the brake assembly flows into a cavity 130 formed in housing 23 through a portion 132 of the cavity 130 extending between a first surface 102 of the brake piston 100 and the back plate 110 of the housing 23. Hydraulic fluid pressure in the portion 102 of the cavity 130 extending between the first portion 102 of the brake piston 100 and the back plate 110 of the housing 23 under the action of brake pedal 3 (FIG. 2) axially moves the brake piston 100 and with it brake hub 30 in the direction of the friction brake 70 and the impeller brake 50.

Housing 23 has a plate 1100 provided with a threaded opening 1104. A first side 79 of friction brake 70 is seated against an inside portion 1102 of the housing 23. Housing 23 further has a back plate 1130 provided with a threaded opening 1132. A second side 75 of friction brake 70 is seated against the second portion 34 of the brake hub 30. A spring 1140 is disposed between the plate 1100 and the second portion 34 of the brake hub over a telescopic dowel (not shown) having ends that threadingly engage with threaded openings 1104 and 1132 to attach spring 1140 to the housing 23. Illustratively, two or three additional springs 1140 located generally equidistant about the perimeter of the housing may be used to enable the plate 1100 of housing 23 to be biased as it axially moves in the direction of the wheel under the influence of hydraulic pressure and under that bias to return the plate 1100 to the neutral position once the hydraulic pressure applied to the brake piston 100 is removed.

Illustratively, brake assembly 20 has a first fluid system 68 and a second fluid system 69. The brake assembly of impeller brake 50 and friction brake 70 are bathed in axle fluid used for lubricating the axle of the machine 1 to form the first fluid system 68 for the brake assembly. A port or ports 134 allow axle fluid to flow between an axle lubricating system (not shown) and the impeller and friction brakes for this purpose. The brake piston 100 is bathed in hydraulic fluid from a brake line responsive to the brake pedal 3 (FIG. 2) in the second fluid system for the brake assembly.

Figure 4:
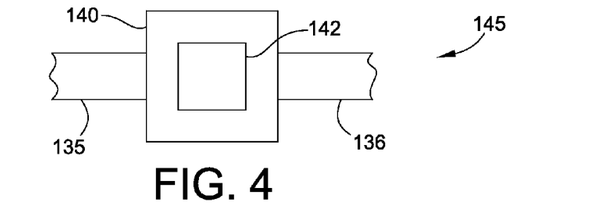
FIG. 4 is a functional diagram of a cooling system that may be used with the illustrative brake system according to the present disclosure.

Illustratively, the first fluid system 68 may be designed to operate in a way that normal operation of the brake assembly 20 generally does not cause overheating. Alternatively, a recirculating cooling system 145 as shown in FIG. 4 may be provided to brake assembly to maintain the axle fluid from overheating. In recirculating cooling system 145, axle fluid in cavity 60 exits housing 23 through an exit port 134, as shown in FIG. 3, through an exiting oil channel 135 to an oil filter cooler 140 where the axle fluid is distributed across a radiator core 142 and then returned through a returning oil channel 136 back to oil entry ports (not shown in FIG. 3) for return a to cavity of the second fluid system 69 shown in FIG. 3. The oil filter cooler 140 may be of the passive cooling type where axle fluid passing through the radiator core 142 is cooled down by heat transfer with air surrounding the radiator core 142. Alternatively, a cross flow of a fluid such as a coolant or air may be introduced across the radiator core in a manner well known in the art to provide active cooling of the circulating axle fluid.

In the neutral position of no braking, axle fluid sits in the cavity 60. The action of both a first braking position and a second braking position discussed below, activates impeller brake 50 alone or in combination with friction brake 70 to engage impeller rotor 51 with axle 24 for axial rotation of the impeller rotor 51. The impellor rotor's motion imparts both outwards linear and rotational motion to the axle fluid disposed between the impeller rotor and the stator. The motion of the fluid is effectively toroidal; travelling in one direction in the direction of the rotating rotor blade. The stationary stator surface creates a drag on the toroidally circulating fluid causing a back force on the blades of the rotor retarding of the rotation of the axle. The retarding braking energy heats the axle fluid, and the heat is dissipated (via the radiator core 142 shown in FIG. 4) in the oil cooler 140 of the recirculating cooling system 145 shown in FIG. 4 as previously discussed. The engine 2 will be disengaged from the drive system and idling during the braking action.

Referring again to FIG. 3, a first gap 150 is provided between a first surface 54 of the impeller rotor 51 and a first side surface 92 of the friction disc 90 and the second gap 151 is provided between a first side surface 77 of the friction brake 70 and the second portion 34 of the brake hub 30 when said brake assembly is in said neutral position of no braking. The second gap 151 between the friction brake 70 and the brake hub 30 is wider than the first gap 150 between the impeller rotor 51 and the friction disc 90 for reasons discussed below. Illustratively, the first gap 150 may be about 0.15 mm and the second gap 151 may be about 0.35 mm as one comparison between gap dimensions providing for a cumulative gap of about 0.5 mm for braking action as discussed below.

Under the action of brake pedal 3 (shown in FIG. 2) in a first braking position, hydraulic pressure in the portion 132 of the cavity 130 extending between the first surface 102 of the brake piston 100 and the back plate 110 of the housing 23 moves brake piston 100 and brake hub 30 axially in the direction of the friction brake 70 and the impeller brake 50 the distance of the first gap 150 frictionally engaging friction disc 90 and impeller rotor 51, through the frictional engagement of the first side surface 92 of friction disc 90 with the first surface 54 of the rotor under the applied pressure of the first braking position, to provide impeller braking to retard the speed of the machine. The distance of the first gap traveled reduces the size but does not close the second gap 151 between the brake piston 100 and the friction brake 70 maintaining the friction brake disengaged during the first braking position.

Under the action of brake pedal 3 in a second braking position, brake piston 100 and brake hub 30 move axially in the direction of the friction brake 70 and the impeller brake 50 the distance remaining to close the second gap 151 frictionally engaging brake hub 30 and friction brake 70, through the frictional engagement of the second portion 34 of the brake hub 30 against the first side surface 77 of the friction brake 70, to provide friction braking to reduce the speed of the machine 1. In the second braking position, the impeller brake 50 becomes more deeply engaged as the closing of the second gap 151 by the second braking position moves rotor blades 52 of impeller rotor 51 deeper into channel 67. Increasing retarder brake action is the result which combined with the frictional braking action occurring in the second braking position further reduces the speed of the machine 1.

Under the action of brake pedal 3 in a third braking position, brake piston 100 and brake hub 30 move axially even further in the direction of the friction brake 70 and the impeller brake than in the first and second braking positions to provide increased frictional engaging of friction brake 70 and increased impeller braking of impeller brake 50 to provide emergency stopping of the machine.

Figure 5:
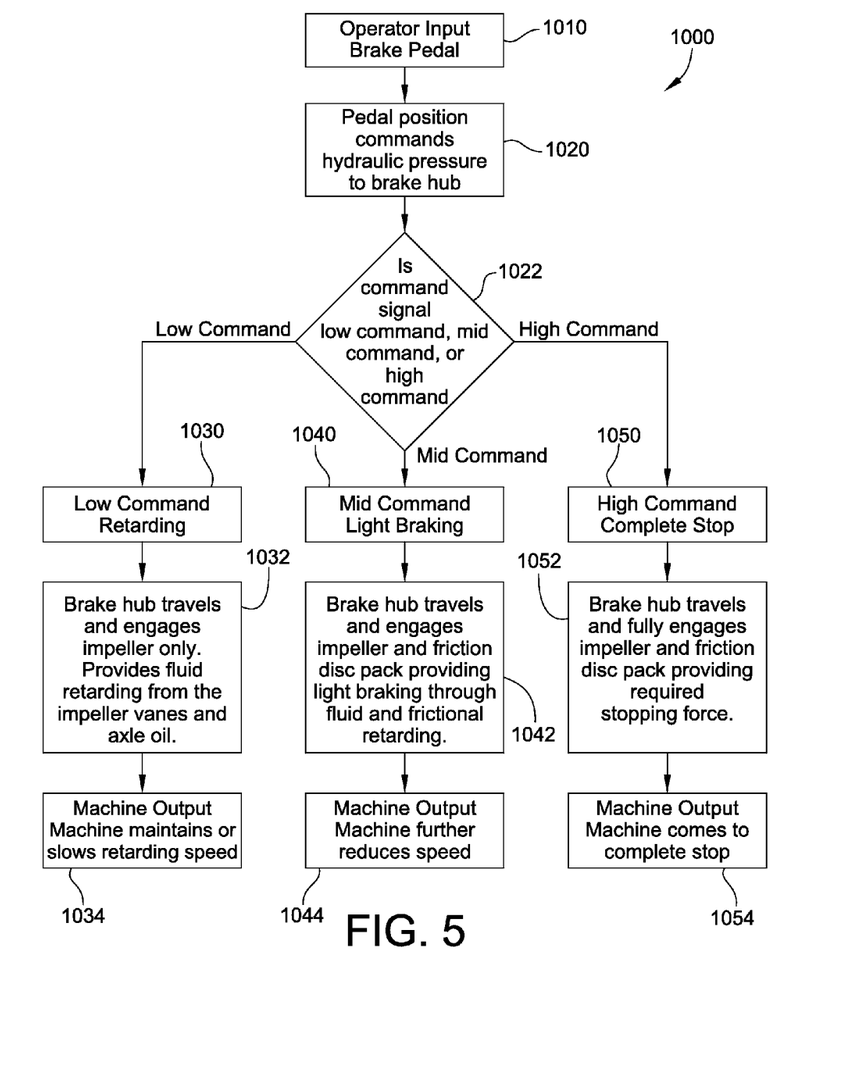
FIG. 5 is a flow diagram illustrating one process flow for controlling the illustrative brake system according to the present disclosure.

FIG. 5 illustrates a flow chart of an exemplary embodiment of a braking process 1000 for machine 1. As mentioned above, brake assembly 20 may control braking based on braking demand, the amount of braking provided by the impeller in the first braking position, the amount of additional braking provided by both impeller brake and friction brake in the second braking position, and the amount of yet additional braking provided by hard impeller braking and hard friction braking in the third braking position. Thus, controlling the machine 1 based on these illustrative conditions allows retarder or friction braking control of the machine for improved machine 1 performance all in response to a single braking action controlled by the operator on a single brake assembly that has been integrated with both retarder and friction brake functionality in accordance with disclosure.

As shown in FIG. 5, at step 1010 the operator 8 depresses the brake level to a predetermined braking position. At step 1020, the position of the pedal commands hydraulic pressure to brake hub 30. At step 1022, the process determines whether the command is a LOW COMMAND, a MID COMMAND, or a HIGH COMMAND. If the command is a LOW COMMAND, the process advances to step 1030 where the machine 1 senses the low command indicating a retarding brake action. At step 1032, the brake hub travels and engages the impeller only. The impeller provides fluid retarding from the impeller blades and axle oil. In response thereto, at step 1034, the machine maintains or slows retarding speed.

If the command is a MID COMMAND, the process advances to step 1040 where the machine 1 senses the mid command indicates a light braking action. At step 1042, the brake hub travels and engages the impeller deeper and also engages the friction disc providing light braking through fluid and frictional retarding. In response thereto, at step 1044, the machine further reduces speed.

If the command is a HIGH COMMAND, the process advances to step 1050 where the machine 1 senses the high command indicates a complete stop. At step 1052, the brake hub travels and engages the impeller and friction brake even deeper providing required stopping force, such as may be specified by machine operating requirements or by industrial standards. In response thereto, at step 1054, the machine stops.

Industrial Applicability

The brake assembly 20 described above provides the operator 8 with control over the machine's 1 speed. In a neutral braking position, the impeller brake 50 and friction brake are disengaged.

As the operator 8 begins down in inclined terrain 18 (see FIG. 2) and applies the brake pedal 3 to a first braking position, pressurized hydraulic fluid axially moves in a first braking position to retard and or reduce the speed of the machine 1 as demanded, hydraulic pressure in the portion of cavity 132 of cavity 130 moves brake piston 100 and brake hub 30 axially in the direction of the friction brake 70 and the impeller brake 50 the distance of the first gap 150 frictionally engaging friction disc 90 and impeller rotor 51, through the frictional engagement of the first side surface 92 of friction disc 90 with a first surface 54 of the rotor under the applied pressure of the first braking position, to provide impeller braking to retard or slow the speed of the machine 1. The distance of the first gap traveled reduces the size but does not close the second gap 151 between the brake piston 100 and the friction brake 70 maintaining the friction brake disengaged during the first braking position.

As the operator 8 applies the brake pedal 3 to a second braking position for greater braking action to reduce the speed of the machine 1, brake piston 100 and brake hub 30 move axially in the direction of the friction brake 70 and the impeller brake 50 the distance remaining to close the second gap 151 frictionally engaging brake hub 30 and friction brake 70, through the frictional engagement of the second portion 34 of the brake hub 30 against the first side surface 77 of the friction brake 70, to provide friction braking to reduce the speed of the machine 1. In the second braking position, the impeller brake 50 becomes more deeply engaged as the closing of the second gap 151 by the second braking position moves rotor blades 52 of impeller rotor 51 deeper into channel 67. Increasing retarder brake action is the result which combined with the frictional braking action occurring in the second braking position further reduces the speed of the machine 1.

As the operator 8 applies the brake pedal 3 to a third braking position for even greater braking action to bring the machine to a stop, brake piston 100 and brake hub 30 move axially even further in the direction of the friction brake 70 and the impeller brake than in the first and second braking positions to provide increased frictional engaging of friction brake 70 and increased impeller braking of impeller brake 50 to provide emergency stopping of the machine.

Figure 6:
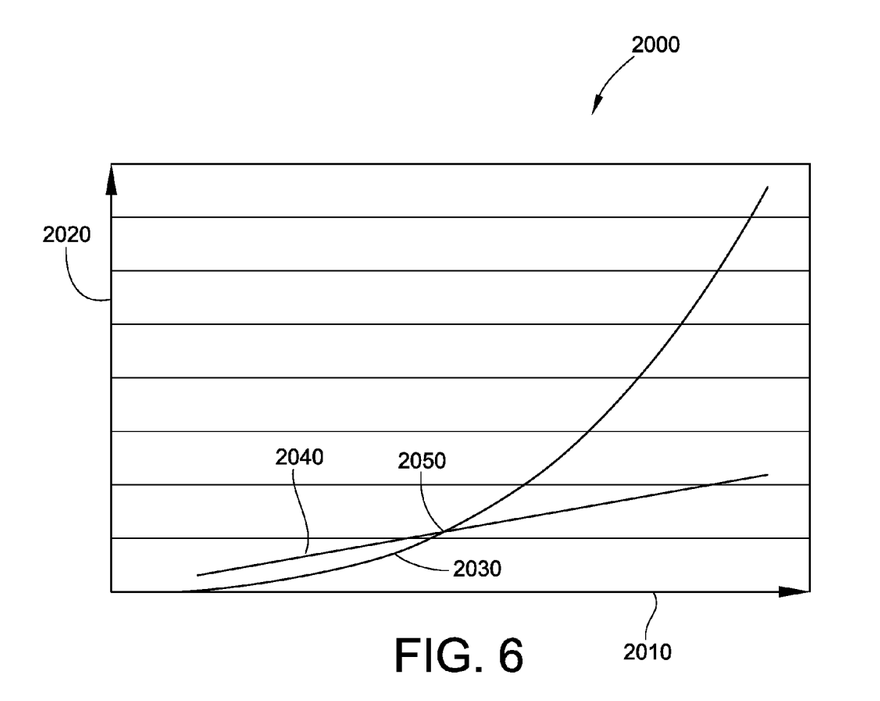
FIG. 6 is a graph showing braking power as a function of the speed of the machine.

FIG. 6 illustrates machine performance showing braking power 2020 as a function of the speed 2010 of the machine and illustrates the uses that may be made of the brake assembly 20 of this disclosure. Curve 2030 shows the power curve for an ideal impeller versus speed. As the speed of the machine increases, the power of the ideal impeller increases exponentially. The power of the impeller is seen to be exponentially related to speed. Curve 2040 shows the braking power required to retard at that speed. Stopping requirements for stopping of off highway machines may be based on many factors including grade, weight, location, and population. Any set of defined stopping requirements may be used to practice this disclosure including the set of stopping requirements defined by the ISO standards.

The cross-over point 2050 of the power curves 2030 and 2040 shows that at machine speeds at about the speed of the cross-over point 2050 or higher you can retard the machine to maintain the indicated machine speed using the power of the impeller alone. This is because at this speed, the power of the impeller is greater than the power required to maintain the machine at the desired speed. Below this speed, the power generated by the impeller is insufficient to maintain the machine at the desired speed. Hence, if the machine is operating below this speed, the operator will need to use the friction brake in addition to the impeller brake to maintain the machine at the desired speed.

The cross-over point 2050 of the power curves 2030 and 2040 also shows that at machine speeds of about or higher than the cross-over point you can retard the machine at that speed. This is because at speeds at or higher than the cross-over-point 2050, the power of the impeller is greater than the power required to bring the machine speed to a dead stop. Below the cross-over point, the power generated by the impeller is insufficient to bring the machine to a dead stop. Hence, if the machine is operating at a speed below the cross-over point, the operator will need to use the friction brake in addition to the impeller brake to bring the machine to a dead stop.

These drawings illustrate some of the uses to which the brake assembly may be put and the benefits from those uses. At a speed of the machine above the cross-over point, the impeller brake provides a very useful source of braking power for retarding the machine to a specified speed or bringing the machine to a complete stop. These stopping requirements may be specified for machine operations and may include the stopping requirements that are specified by the ISO standards. Below the cross-over-point, the impeller brake provides the braking power required to retard the machine to a specified speed within these ranges of speed but not enough braking power to provide dead stop braking requirements. In this range of speeds of the machine, the disclosure provides for the coaction of the impeller brake with a friction brake to meet dead stop braking requirements.

The disclosed assembly brake advantageously brings together the performance of an impeller brake and the performance of a friction brake into an integrated brake assembly design. By locating both impeller and friction brake into an integrated assembly, a higher performance brake assembly results; one that advantageously provides impeller braking action under machine operating conditions requiring less demanding brake action such as to retard or slow down the machine and provides friction brake action when more demanding brake action is required such as for dead stop braking, all under a single braking action applied by the operator to one brake assembly, the integrated brake assembly of this disclosure. By setting gap 150, the closing of which activates impeller braking, to be narrower than the gap 151, the closing of which activates friction braking, the integrated brake assembly of this disclosure advantageously ensures that one brake assembly delivers impeller braking in circumstances where retarding or slowing down the machine is required and friction braking when dead stop breaking is required; all by the action of a single braking action by the operator.

The disclosed brake assembly provides a two stage integrated braking process and system incorporating two braking systems, an impeller retarder brake and a friction into the existing service brake design. The two-stage control scheme disclosed enables the retarding impeller to be engaged for light braking and down-hill hauling and for the friction disc to be engaged for immediate stoppage.

As an integrated assembly, the disclosed assembly may advantageously replace one or more of the hydraulic impeller systems that are currently used on off highway machines, such as a transmission hydraulic retarder.

The integrated brake assembly provides many other benefits including from a system and a component level. By incorporating the impeller retarder into the brake assembly, there is less wear on the friction discs which enables the friction discs to be used for longer periods of time between change-out. This allows for longer periods between friction brake maintenance. The disclosed brake assembly removes the need of a hydraulic retarder brake assembly separate from the friction brake assembly for hauling applications. This leads to cost savings by removing the need to have a retarder assembly separate from the friction brake. The bundled brake solution also uses the pressure from the retarder to perform active on-axle filtering due to the circulation of the axle fluid through the oil cooling system 145 under the action of retarder braking.

While the friction brake is shown as a friction brake including a plurality of rotatable friction discs mounted for rotation with the axle and a plurality of plates, one between each pair of adjacent rotatable friction discs, attached to the housing for axial movement attached to the housing said for axial movement interleaved between the plurality of rotatable friction discs; wherein in said neutral position and in said first braking position, said plurality of axially movable plates and said plurality of rotatable friction disc are disengaged it will be understood that the number of rotatable discs and plates depend on the design of the brake assembly. For example, it may be possible to use a single rotatable friction disc and single plate for the friction brake.

While the brake assembly of impeller 50 and friction brake 70 are shown in FIGS. 1 and 3 bathed in axle fluid used for lubricating the axle of the machine to form a first fluid system for the brake assembly and the brake piston 100 is shown bathed in hydraulic fluid from a brake line responsive to the brake pedal 3 in a second fluid system for the brake assembly, it will be understood that both fluid systems may be merged into one fluid system so that the same type of fluid may be used for both the impeller brake and friction brake and the brake piston. For example, the hydraulic fluid from the brake line responsive to the brake pedal 3 may be used as fluid for the impeller brake and friction brake as well. In this case, the port or ports that allow axle fluid to flow between the axle lubricating system and the impeller and friction brakes would be closed and a port or ports would be opened between the cavity 60 and the brake line responsive to the brake pedal 3 to allow hydraulic fluid to bathe the impeller and friction brakes.

Figure 7:
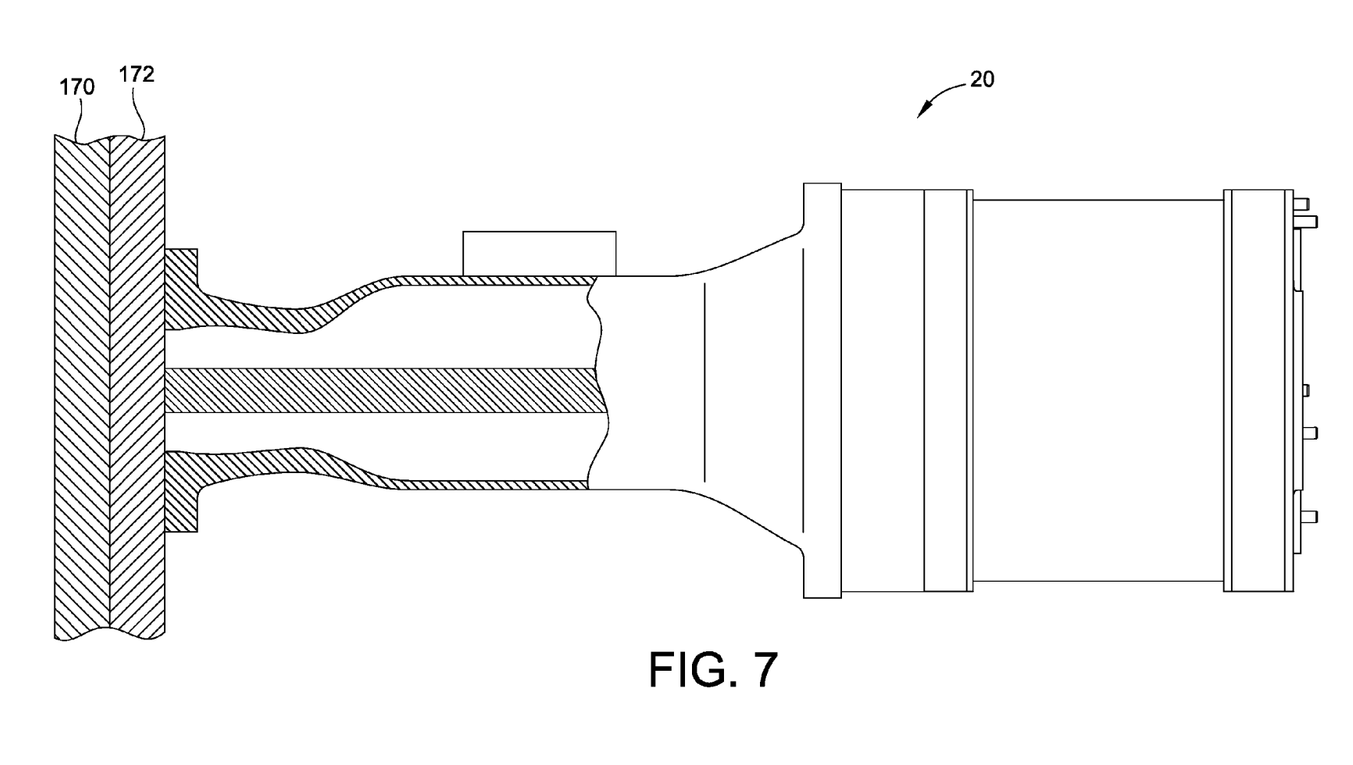
FIG. 7 is another illustrative brake system according to the present disclosure.

While the integrated brake assembly is shown in FIGS. 1 and 3 to be adjacent differential 22, it will be understood that location of the brake assembly along the housing 23 depends on the design of the brake assembly. For example, as shown in FIG. 7, it may be possible to move brake assembly 20 from the position shown in FIGS. 1 and 3, where brake assembly is in proximity to differential 22, farther away from differential 22 and closer to the wheel such as in location 170. As another example, it may be possible to locate the brake assembly 20 in location 170, and in addition, to dispose in the housing between transmission 16 and the brake assembly 20, a final drive 172 including a planetary set of gears to change the torque and speed that goes to wheel 7 of the machine 1.

It will be apparent to those skilled in the art that various modifications and variations can be made to the disclosed brake system. Embodiments other than the ones that are herein disclosed will be apparent to those skilled in the art from the consideration of the specification and practice of the disclosed braking system. It is intended that the specification and examples be considered as exemplary only, with a true scope being indicated by the following claims and their equivalents.

What is claimed is:

1. A retarding brake assembly comprising:
a brake hub mounted inside a housing of an axle of a machine for movement in an axial direction;
an impeller brake mounted inside said housing; and
a friction brake mounted inside said housing,
wherein said impeller brake and said friction brake are disengaged from said brake hub in a neutral position,
said brake hub engages said impeller brake in a first axial movement for retarding rotation of said axle in a first braking position under an action of a first applied hydraulic pressure,
said brake hub frictionally engages said friction brake in a second axial movement for frictionally braking rotation of said axle in a second braking position under an action of a second applied hydraulic pressure
said first and said second hydraulic pressure are applied to said brake hub,
said brake assembly defines a first gap between said impeller brake and said brake hub, and a second gap between said friction brake and said brake hub,
said first axial movement of said brake hub under the action of said first applied hydraulic pressure in said first braking position closes said first gap to engage said impeller brake for retarding rotation of said axle, and
said second axial movement of said brake hub under the action of said second applied hydraulic pressure in said second braking position closes said second gap to engage said friction brake for frictionally braking rotation of said axle.

2. The retarding brake assembly of claim 1:
wherein said impeller brake and said friction brake are located on a same side as said brake hub and said first gap has a width that is of a smaller dimension than a width of said second gap; and
wherein said first axial movement and said second axial movement of said brake hub under the action of both said first and said second applied hydraulic pressure, respectively, are in a same direction;
said first axial movement of said brake hub under the action of said first applied hydraulic pressure in the first braking position closing said first gap to engage said impeller brake for retarding rotation of said axle and at least partially closing said second gap, wherein said friction brake remains disengaged; and
said second axial movement of said brake hub under the action of said second applied hydraulic pressure in the second braking position being a continuation of said first axial movement of said brake hub under the action of said first applied hydraulic pressure in the first braking position,
whereupon said impeller brake remains engaged for retarding rotation of said axle in the second braking position and whereupon closing of said second gap by said continued axial movement of said brake hub under the action of said second applied hydraulic pressure in the second braking position said friction brake is engaged for frictionally braking rotation of said axle.

3. The retarding brake assembly of claim 1, wherein said impeller brake comprises:
an impeller rotor mounted on said axle of said machine for rotation therewith; and
a stator defined by said housing,
said impeller rotor and said stator defining a chamber for holding a fluid therein to retard a rotational speed differential between said impeller rotor and said stator.

4. The retarding brake assembly of claim 3 wherein said fluid is axle oil.

5. The retarding brake assembly of claim 4 further including a bearing disposed between said impeller rotor and said axle for reducing drag from said impeller rotor on said axle in said neutral position of said retarding brake assembly.

6. The retarding brake assembly of claim 5 wherein said bearing is a sleeve bearing.

7. The retarding brake assembly of claim 1:
wherein said friction brake comprises a rotatable friction disc mounted for rotation with said axle, and an axially movable plate attached to said housing for axial movement;
wherein said axially movable plate and said rotatable friction disc are disengaged in said neutral position and in said first braking position; and
wherein said brake hub frictionally engages said axially moveable plate to said rotatable friction disc for frictionally braking rotation of said axle in said second braking position.

8. The retarding brake assembly of claim 1:
wherein said friction brake comprises a plurality of rotatable friction discs mounted for rotation with said axle and a plurality of axially movable plates, each plate of the plurality of axially movable plates being disposed on either side of one disc of the plurality of rotatable friction discs, the plurality of axially movable plates being attached to said housing for axial movement along said axle;

wherein said plurality of axially movable plates and said plurality of rotatable friction disc are disengaged in said neutral position and in said first braking position; and wherein said brake hub frictionally engages said plurality of axially moveable plates to said plurality of rotatable friction discs for frictionally braking rotation of said axle in said second braking position.

9. A machine with a retarding brake assembly comprising:

a brake hub mounted inside a housing of an axle of said machine for movement in an axial direction;

an impeller brake mounted inside said housing; and a friction brake mounted inside said housing, wherein said impeller brake and said friction brake are disengaged from said brake hub in a neutral position, said brake hub engages said impeller brake in a first axial movement for retarding rotation of said axle of said machine in a first braking position under an action of a first applied hydraulic pressure, said brake hub frictionally engages said friction brake in a second axial movement for frictionally braking rotation of said axle of said machine in a second braking position under an action of a second applied hydraulic pressure, said first and said second hydraulic pressure are applied to said brake hub, said brake assembly defines a first gap between said impeller brake and said brake hub and a second gap between said friction brake and said brake hub, said first axial movement of said brake hub under the action of said first applied hydraulic pressure in said first braking position closes said first gap to engage said impeller brake for retarding rotation of said axle of said machine, and said second axial movement of said brake hub under the action of said second applied hydraulic pressure in said second braking position closes said second gap to engage said friction brake for frictionally braking rotation of said axle of said machine.

10. The machine with a retarding brake assembly of claim 9:

wherein said impeller brake and said friction brake are located on a same side as said brake hub and said first gap has a width that is of a smaller dimension than the width of said second gap, wherein said first axial movement and said second axial movement of said brake hub under the action of both said first and said second applied hydraulic pressure, respectively, are in a same direction, said first axial movement of said brake hub under the action of said first applied hydraulic pressure in the first braking position closes said first gap to engage said impeller brake for retarding rotation of said axle, and at least partly closes said second gap, wherein said friction brake remains disengaged, said second axial movement of said brake hub under the action of said second applied hydraulic pressure in the second braking position being a continuation of said first axial movement of said brake hub under an action of said first applied hydraulic pressure in the first braking position, whereupon said impeller brake remains engaged for retarding rotation of said axle in the second braking position, and whereupon closing of said second gap by said continuation of said first axial movement of said brake hub under the action of said second applied hydraulic pressure in the second braking position said friction brake is engaged for frictionally braking rotation of said axle.

11. The machine with a retarding brake assembly of claim 9 further comprising:

a first brake fluid system and a second brake fluid system;

said first brake fluid system bathing said impeller brake and said friction brake in a fluid used to lubricate said axle; and said second brake fluid system bathing a brake piston in a hydraulic fluid from a brake line responsive to a brake pedal.

12. The machine with a retarding brake assembly of claim 9 further comprising a recirculating cooling system for cooling a fluid used with said impeller brake and said friction brake.

* * * * *

UNITED STATES PATENT AND TRADEMARK OFFICE
CERTIFICATE OF CORRECTION

PATENT NO. : 8,910,758 B2  
APPLICATION NO. : 13/424086  
DATED : December 16, 2014  
INVENTOR(S) : Jensen et al.

Page 1 of 1

It is certified that error appears in the above-identified patent and that said Letters Patent is hereby corrected as shown below:

In the specification

Column 6, lines 57-58, delete "return a to cavity" and insert -- return to a cavity --.

Column 8, line 43, delete "Industrial Applicability" and insert -- INDUSTRIAL APPLICABILITY --.

Signed and Sealed this  
Tenth Day of November, 2015

Michelle K. Lee  
*Director of the United States Patent and Trademark Office*